US011955741B2

(12) United States Patent
Lin et al.

(10) Patent No.: US 11,955,741 B2
(45) Date of Patent: Apr. 9, 2024

(54) BUCKLE CONNECTOR

(71) Applicant: P-TWO INDUSTRIES INC., Taoyuan (TW)

(72) Inventors: Shien-Chang Lin, Taoyuan (TW); Chun-Wei Chang, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 0 days.

(21) Appl. No.: 16/844,245

(22) Filed: Apr. 9, 2020

(65) Prior Publication Data

US 2020/0350715 A1 Nov. 5, 2020

(51) Int. Cl.

*H01R 12/71* (2011.01)
*H01R 12/70* (2011.01)
*H01R 12/73* (2011.01)

(52) U.S. Cl.

CPC ....... *H01R 12/714* (2013.01); *H01R 12/7023* (2013.01); *H01R 12/732* (2013.01)

(58) Field of Classification Search

CPC .............. H01R 12/714; H01R 12/7017; H01R 12/7023; H01R 12/732; H01R 12/735; H01R 35/04; H01R 13/113
See application file for complete search history.

(56) References Cited

U.S. PATENT DOCUMENTS

2012/0238144 A1* 9/2012 Yasui .................. H01R 12/724 439/627

* cited by examiner

*Primary Examiner* — Oscar C Jimenez
(74) *Attorney, Agent, or Firm* — Sinorica International Pa

(57) ABSTRACT

The present invention discloses a buckle connector connecting a main board and a sub-board. The buckle connector includes a first connecting portion and a second connecting portion. The first connecting portion mainly provides a first coupling member and the second connecting portion mainly provides a second coupling member. The first connecting portion and the second connecting portion are disposed on the same plane by coupling the first coupling member and the second coupling member when the first connecting portion moves to the second connecting portion in one direction.

9 Claims, 5 Drawing Sheets

BUCKLE CONNECTOR

FIELD OF THE INVENTION

The invention relates to a buckle connector, particularly relates to a buckle connector capable of board-to-board connection.

BACKGROUND OF THE INVENTION

Traditionally, two printed circuit boards can be connected through a connector to transmit signals between two printed circuit boards.

Although the connector is convenient to connect two printed circuit boards, it is inevitable to be detached by the impact of external force during the assembly process. It is not easy to align the terminals of the connector, which will damage the terminal and affect the electrical characteristics of the connector.

Furthermore, in order to accommodate the small assembly space, it is necessary to reduce the size of the connector. However, in the process of assembling the reduced connector, the aforementioned problem, the boards easily are detached or the terminals are damaged, is more likely to occur.

In view of this, the present invention proposes a buckle connector for solving the defect caused by the conventional connector.

SUMMARY OF THE INVENTION

The first object of the present invention is to provide a buckle connector for board-to-board connection through the male end (or female end) of the first connecting portion connected to the female end (or male end) of the second connecting portion.

The second object of the present invention is that the first connecting portion coupled to the second connecting portion through the first coupling member of the first connecting portion coupled to the second coupling member of the second connecting portion in accordance with the foregoing buckle connector.

According to the foregoing buckle connector, the third object of the present invention is that the first coupling member and the second coupling member providing the inclined planes respectively, so that the first connecting portion is coupled to the second connecting portion easily by the first coupling member sliding into the second coupling member (with the function of positioning and guiding).

According to the foregoing buckle connector, the fourth object of the present invention is that the first connecting portion and the second connecting portion are coupled vertically or at an angle for the purpose of easy assembly.

According to the foregoing buckle connector, the fifth object of the present invention is that the first coupling member coupled to the second coupling member through the elastic force provided by the snap fastener of the second coupling member and the trench of the first coupling member.

According to the foregoing buckle connector, the sixth object of the present invention is that the second coupling member is formed between any two grooves which are configured to set the first terminal of the first connecting portion.

According to the foregoing buckle connector, the seventh object of the present invention is that the grooves include inclined planes so that the first terminals can be easily slid into when the first connecting portion coupled to the second connecting portion.

According to the foregoing buckle connector, the eighth object of the present invention is that the first coupling portion is restrained at the second coupling member after the first connecting portion coupling to the second connecting portion.

In order to achieve the above-mentioned objects and other objects, the present invention provides a buckle connector for coupling the main board and the daughter board. The buckle connector includes a first connecting portion and a second connecting portion. The first connecting portion includes a first housing and a plurality of the first terminals, the first housing forming a first accommodating space for accommodating the terminals. One end of the first terminals are electrically connected to the daughter board and the first housing forms a first coupling member. The first coupling member is protruded from a side of the first housing, wherein the first coupling member forms a groove, wherein the trench is formed on the first coupling member. The second connecting portion includes a second housing, a plurality of second terminals and a snap fastener, the second housing forming a plurality of grooves for accommodating the second terminals, one end of the second terminals electrically connected to the main board, the other end of the second terminals electrically connected to the other end of the second terminals, the second housing forming a second coupling member between any two of the grooves, the snap fastener is disposed on the second joint member; wherein the first connecting portion moves to the second connecting portion in a direction and the trench is against the snap fastener, the first coupling member coupled to the second coupling member so that the first connecting portion and the second connecting portion are disposed on the same plane and the first terminals are electrically connected to the second terminals.

Compared with the prior art, the present invention provides the buckle connector which can be easily assembled during the assembly process of the male end and the female end portion. The disconnection between male end and female end are driven by the impact of external force can be avoided. The present invention provides a male end (or a female end) which can be coupled to the female end (or the male end) vertically or at an angle.

DETAILED DESCRIPTION OF THE PREFERRED EMBODIMENTS

In order to fully understand the objectives, features, and advantages of the present invention, the present invention will be described in detail with a description of the present embodiments and the accompanying drawings.

In the present invention, "a" or "an" is used to describe the elements, parts and components described herein. This is done for convenience of description only and providing a general meaning to the scope of the present invention. Therefore, unless clearly stated otherwise, the description should be understood to include one, at least one, and the singular can also include plural.

In the present invention, the terms "comprising", "including", "having", "containing", or any other similar terms are intended to encompass non-exclusive inclusive. For example, a component, structure, article, or device that contains a plurality element is not limited to such elements as listed herein but may include those not specifically listed but which are typically inherent to the component, structure, article, or device. In addition, the term "or" means an inclusive "or" rather than an exclusive "or" unless clearly stated to the contrary.

Figure 1:
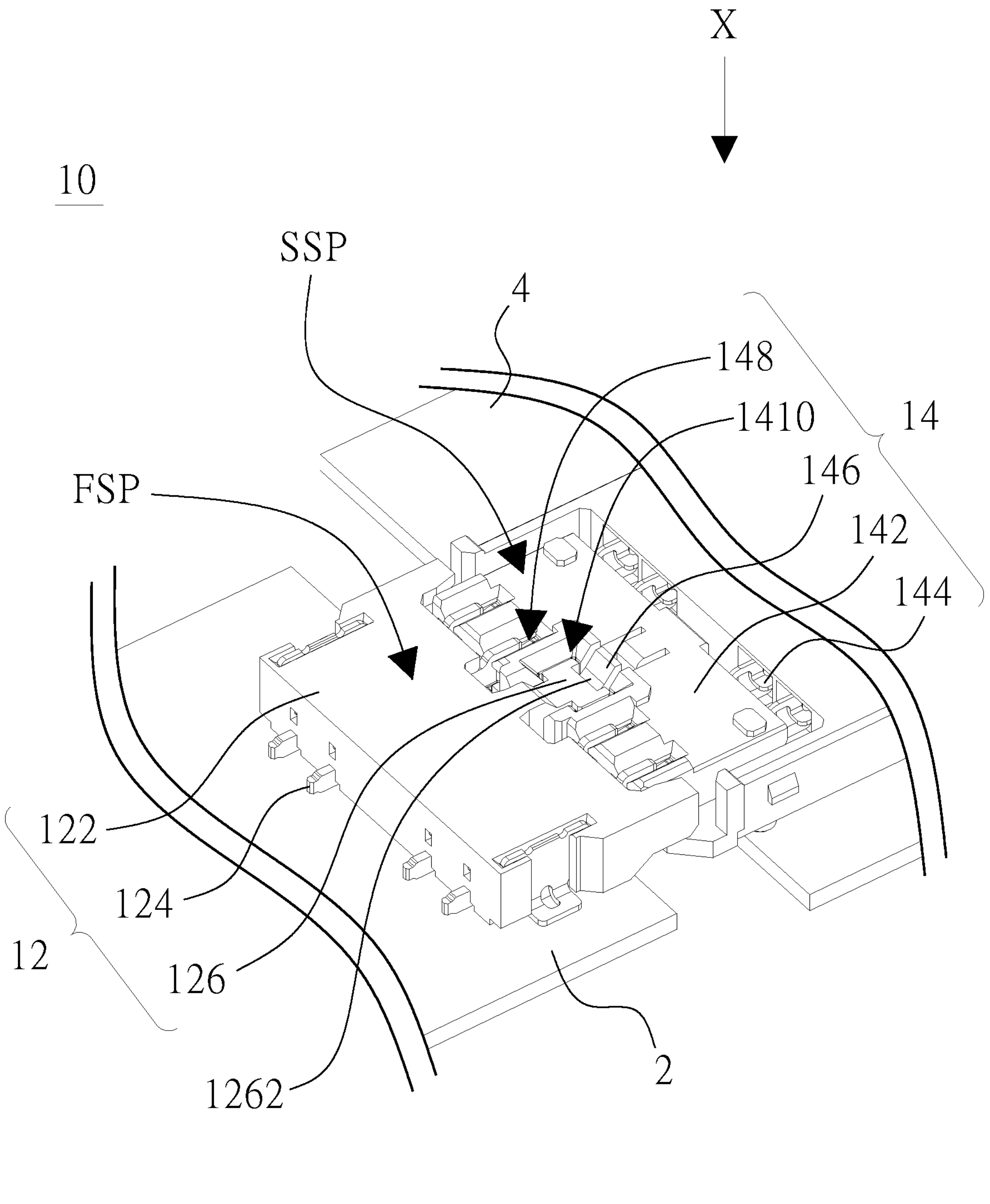
FIG. 1 is the schematic diagram illustrating the structure of the buckle connector according to the first embodiment of the present invention.

Please refer to FIG. 1 which illustrates the first embodiment of the structure of the buckle connector of the present invention. In FIG. 1, a buckle connector 10 connects a daughter board 2 and a main board 4 wherein the daughter board 2 and the min board 4 are printed circuit boards. As an example, in this embodiment, it should be noted that the buckle connector 10 is connected to one daughter board 2. In other examples, the buckle connector 10 can connect two or more daughter board 2.

The buckle connector 10 includes a first connecting portion 12 and a second connecting portion 14. As an example, in the present embodiment, the first connecting portion 12 is described as the male end type and the second connecting portion 14 is described as the female end type. As long as the first connecting portion 12 and the second connecting portion 14 can be connected, which belongs to the scope of the present invention.

Figure 2:
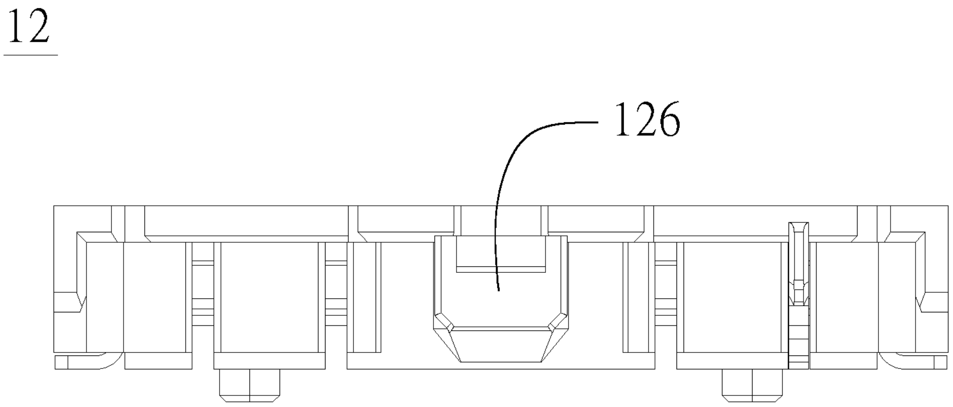
FIG. 2 and FIG. 3 are the schematic diagrams illustrating the structure of the first connecting portion of FIG. 1 according to the present invention.
Figure 3:
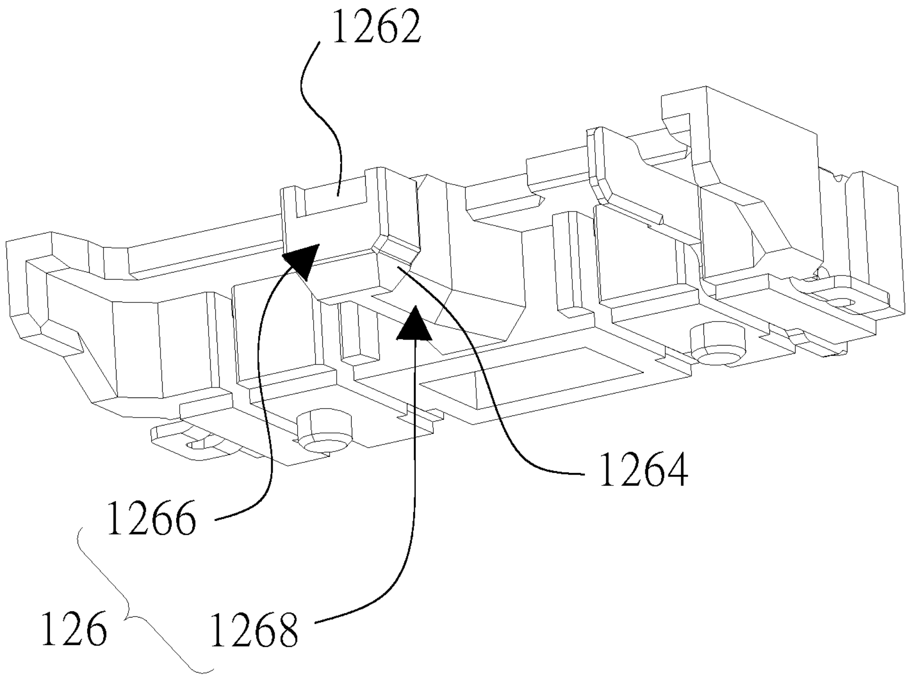

Referring to FIG. 2 and FIG. 3 which illustrate structural schematic diagrams of the first connecting portion of FIG. 1 according to the present invention. In FIG. 2 and FIG. 3, the first connecting portion 12 includes a first housing 122 and a plurality of first terminals 124. The first housing 122 forms a first accommodating space FSP for accommodating the first terminals 124. As an example, in this embodiment, the first housing 122 is the rectangular shape and the first housing 122 is locked on the daughter board 2. Besides, the first housing 122 forms a first coupling member 126, wherein the first coupling member 126 is protruded from a side of the first housing 122. Furthermore, the front end of the first coupling member 126 also forms a trench 1262. The shape of the side surface of the trench 1262 is L-shaped. Furthermore, the first coupling member 126 further forms a first inclined plane 1264.

One end of the first terminals 124 are electrically connected to the daughter board 2 and the other end of the first terminals 124 are electrically connected to the other end of the second terminals 144.

The second connecting portion 14 includes a second housing 142, a plurality of second terminals 144 and a snap fastener 146.

Figure 4:
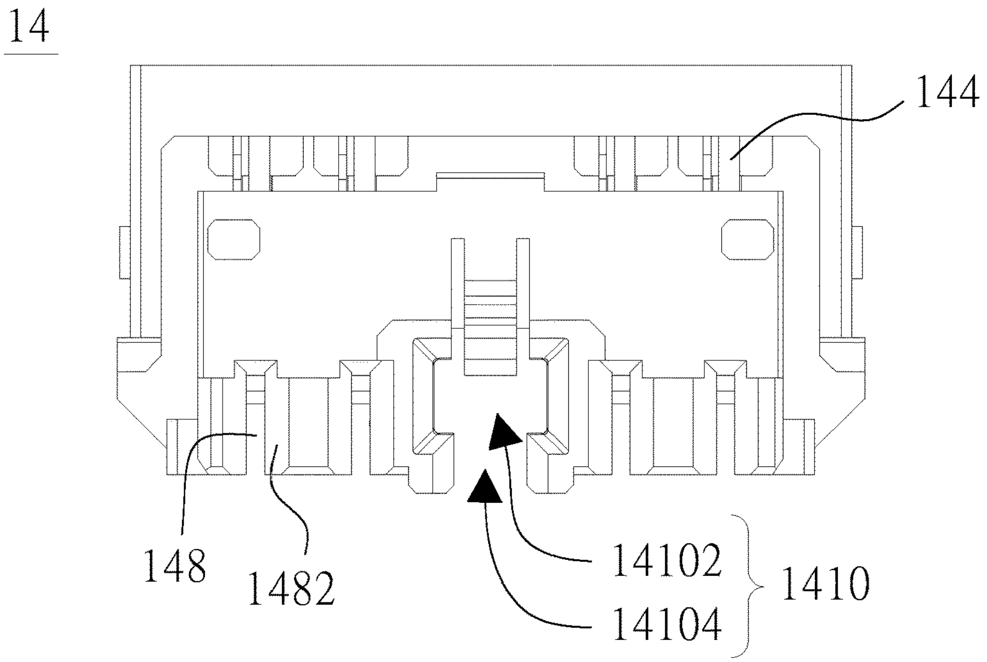
FIG. 4 to FIG. 6 are the schematic diagrams illustrating the structure of the second connecting portion of FIG. 1 according to the present invention.
Figure 5:
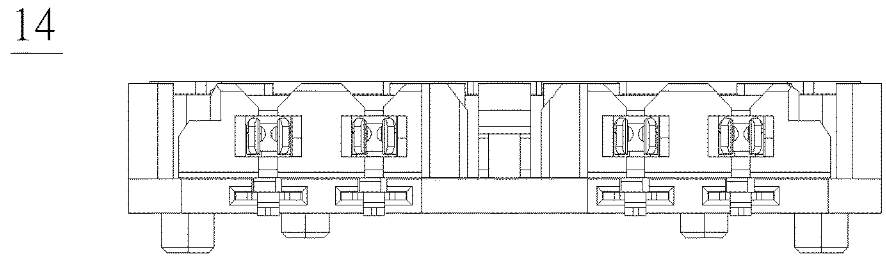
Figure 6:
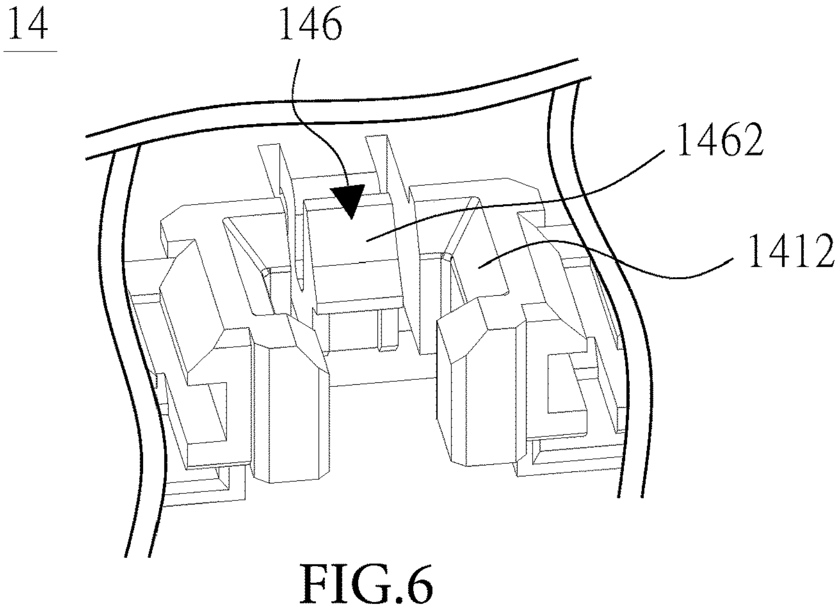

Referring to FIG. 4, FIG. 5, and FIG. 6, which are the structural schematic diagram illustrating the second connecting portion of FIG. 1 according to the present invention. In FIG. 4 to FIG. 6, the second housing 14 forms a plurality of grooves 148 for accommodating the second terminals 144. The second housing 14 is the rectangular shape and the second housing 14 is locked on the main board 4.

One end of the second terminals 144 are electrically connected to the main board 4, the other end of the second terminals 144 are electrically connected to the other end of the first terminals 124. Further, the second housing 14 forms a second coupling member 1410 between any two of the grooves 148. That is, there are two grooves 148 on the left and right side of the second coupling member 1410. In another embodiment, the number of the grooves 148 may be an odd number and the fourth inclined plane 1482 is formed on the inner edge of the grooves 148 to provide the first terminals 124 sliding into and couple to the second terminals 144. In the present invention, as long as the second coupling member 1410 is between any two grooves 148, which belongs to the scope of the present invention. Furthermore, the second coupling member 1410 provides a head opening 14102 and a neck opening 14104, wherein the head opening 14102 communicates with the neck opening 14104. The connection is finished when the first coupling member 126 is a T-shaped body composed of a head 1266 and a neck 1268. The head 1266 is disposed on the head opening 14102 and the neck 1268 is disposed on the neck opening 14104. In another embodiment, the size of the head opening 14102 is not less than the size of the head 1266 to provide the head 1266 on the head opening 14102 for offset setting. Further, the second inclined plane 1412 is formed on the second coupling member 14. For example, the second inclined plane 1412 is formed on the inner edge (or above the inner edge) of the second coupling member 1410 and the second inclined plane 1412 is a plane. The first coupling member 126 through the first inclined plane 1264 and the second inclined plane 1412 sliding into the second coupling member 1410 when the first inclined plane 1264 of the first coupling member 126 touches the second coupling member 126.

Figure 7:
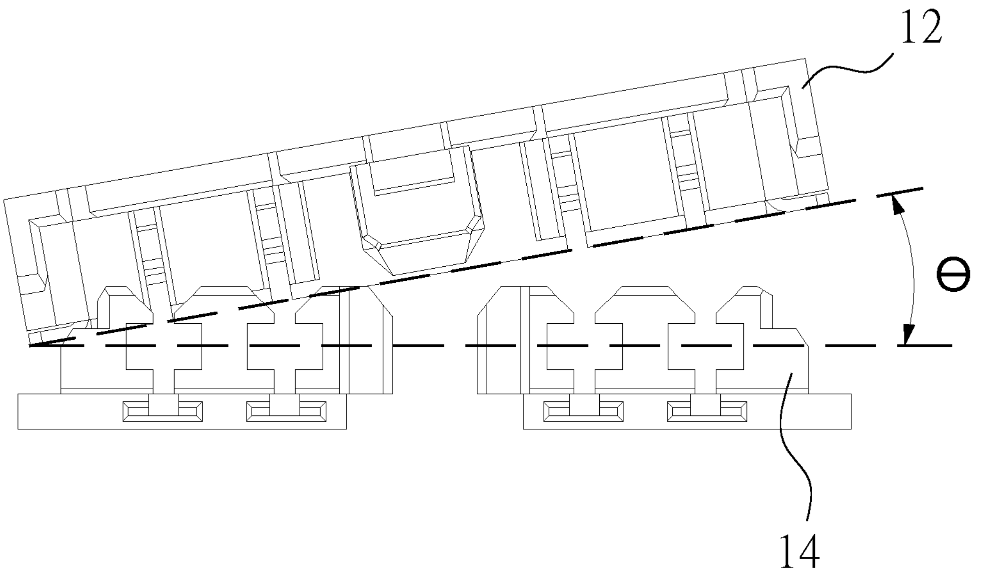
FIG. 7 and FIG. 8 are the schematic diagrams illustrating the structure of the first connecting portion and the second connecting portion of FIG. 1 according to the present invention.
Figure 8:
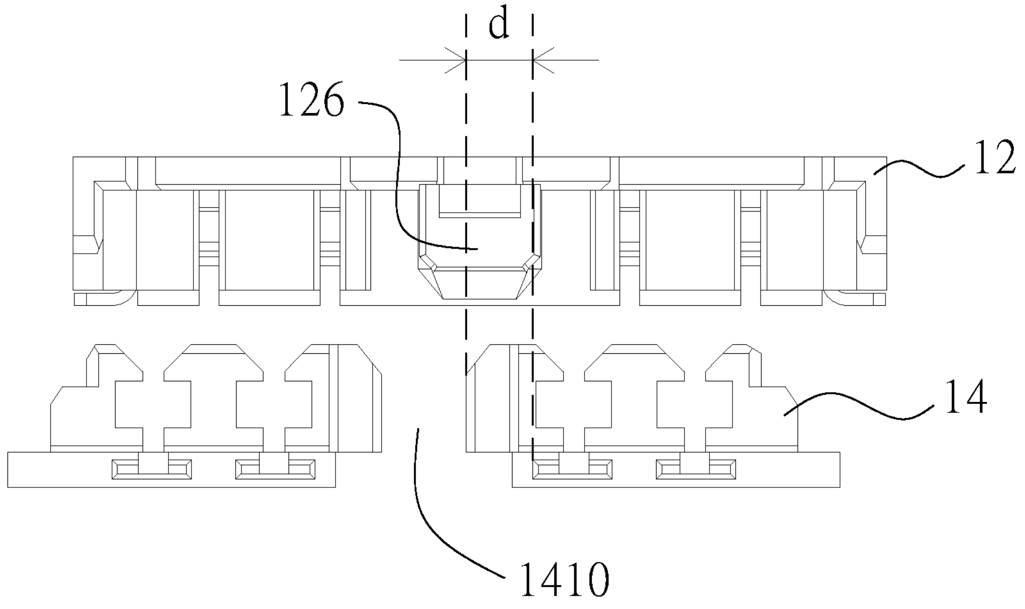

Referring to FIG. 7 and FIG. 8, which are the structural schematic diagram illustrating the first connecting portion 12 and the second connecting portion 14 of FIG. 1 according to the present invention. In FIG. 7, it is mainly explained when the first connecting portion 12 is coupled to the second connecting portion 14, although inclined by an angle θ, for example, the angle is less than or equal to 10 degrees, the first coupling member 126 can still slide into the second coupling member 1410 through the first inclined plane 1264 and the second inclined plane 1412. In FIG. 8, it mainly illustrates the combination of the first inclined plane 1264 and the second inclined plane 1412. During the combination process, the first coupling member 126 can be slid into the second coupling member 1410 through the first inclined surface 1263 guided by the second inclined surface 1412, although there is a deviation displacement d between the first inclined plane 1264 and the second inclined plane 1412.

Referring to FIG. 6, the snap fastener 146 is disposed on the second coupling member 1410 and includes a third inclined plane 1462. The first coupling member 126 slides into the second coupling member 1410 through the first inclined plane 1262, the second inclined plane 1412, and the third inclined plane 1462 when the first inclined plane 1262 touches the second coupling member 1410. In the present embodiment, the snap fastener 146 can be a U-shaped body or an S-shaped body. One end of the snap fastener 146 protrudes on the head opening 14102 in order to generate an elastic force and the first coupling member 126 can be coupled to the second coupling member 1410.

Figure 9:
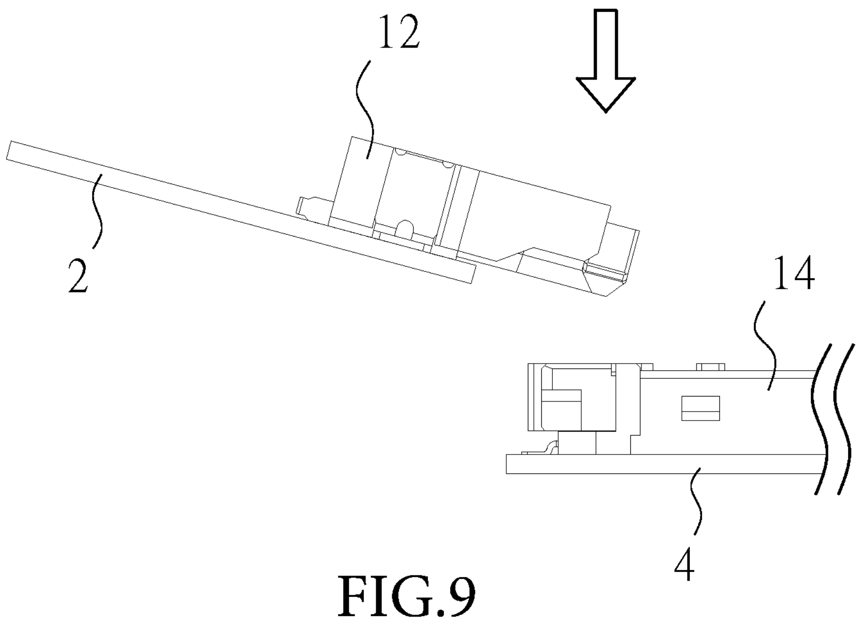
FIG. 9, FIG. 10 and FIG. 11 are the schematic diagram illustrating the structure of the first connecting portion coupled to the second connecting portion of FIG. 1 according to the present invention.
Figure 10:
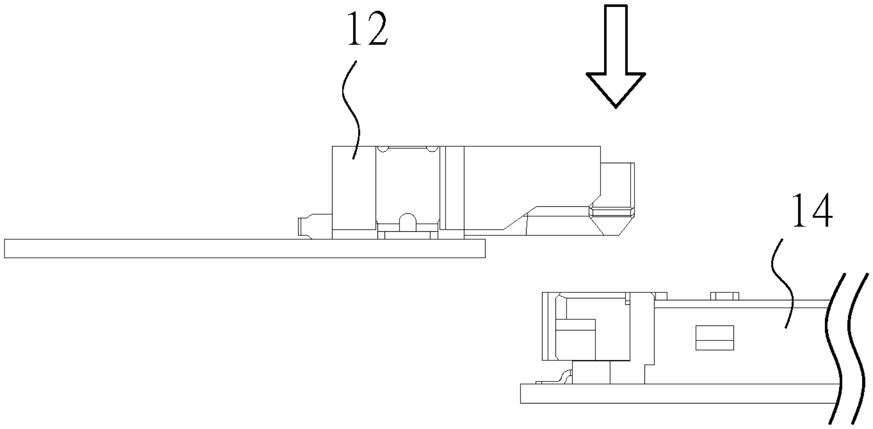
Figure 11:
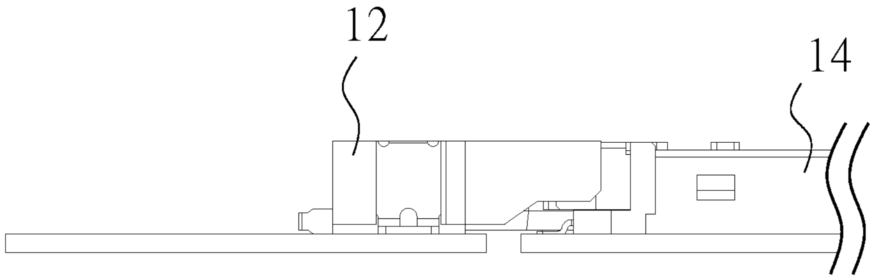

The first connecting portion 12 moves to the second connecting portion 14 in the X direction (please refer to FIG. 9 and FIG. 10) so that the trench 1262 is against the snap fastener 146 and the first coupling member 126 is coupled to the second coupling member 1410. The first connecting portion 12 and the second connecting portion 14 are disposed on the same plane (please refer to FIG. 11) and the first terminals 124 are electrically connected to the second terminals 144. In FIG. 9, the first connecting portion 12 is inserted into second connecting portion 14 at an angle (for example the angle is less than or equal to 20 degrees). In FIG. 10, the first connecting portion 12 is inserted into the second connecting portion 14 in a vertical direction.

The present invention has been disclosed with a preferred embodiments in the foregoing paragraphs, and it should be understood by those skilled professionals in the field that the present invention is not intended to limit the scope of the present invention. It should be noted that variations and permutations equivalent to the present embodiments are intended to be fallen into the scope of the present invention. Therefore, the scope of protection of the present invention is defined by the scope of the patent application.

What is claimed is:

1. A buckle connector for connecting a main board and a daughter board, the buckle connector comprising:

a first connecting portion having a first housing and a plurality of first terminals, the first housing forming a first accommodating space for accommodating the first terminals, one end of the first terminals electrically connected to the daughter board, the first housing forming a first coupling member and the first coupling member protruded from a side of the first housing, wherein the first coupling member forms a groove;

a second connecting portion having a second housing, a plurality of second terminals and a snap fastener, the second housing forming a plurality of grooves for accommodating the second terminals, one end of the second terminals electrically connected to the main board, the other end of the second terminals electrically connected to the other end of the first terminals, the second housing forming a second coupling member between any two of the grooves, the snap fastener is disposed on the first coupling member;

the first connecting portion moves to the second connecting portion in an up-down direction and a trench is against the snap fastener, the first coupling member coupled to the second coupling member so that the first connecting portion and the second connecting portion are disposed on a same plane;

a head opening and a neck opening is provided on the second coupling member; and the first coupling member is a T-shaped body is composed of a head and a neck, the head is disposed on the head opening and the neck is disposed on the neck opening when the first coupling member is coupled to the second coupling member.

2. The buckle connector according to claim 1, wherein a first inclined plane is formed on the first coupling member and a second inclined plane is formed on the second coupling member, the first coupling member slides into the second coupling member through the first inclined plane and the second inclined plane when the first inclined plane touches the second coupling member.

3. The buckle connector according to claim 2, wherein the snap fastener includes a third inclined plane, the first coupling member slides into the second coupling member through the first inclined plane, the second inclined plane, and the third inclined plane when the first inclined plane touches the second coupling member.

4. The buckle connector according to claim 2, wherein the first inclined plane is formed on one side of the first coupling member and the trench is formed on another side of the first coupling member.

5. The buckle connector according to claim 2, wherein the second inclined plane is formed on the second coupling member.

6. The buckle connector according to claim 2, wherein the first coupling member is inserted into the second coupling member through the first inclined plane and the second inclined plane sliding into the second coupling member at an angle of no more than 20 degrees.

7. The buckle connector according to claim 1, wherein the size of the head opening is not less than the size of the head to provide the head on the head opening for offset setting.

8. The buckle connector according to claim 1, wherein the snap fastener is a U-shaped body or an S-shaped body, one end of the snap fastener protruding on the head opening to generate an elastic force when the trench is against the snap fastener.

9. The buckle connector according to claim 8, wherein a fourth inclined plane is formed on the inner edge of the grooves to provide the first terminals sliding into and couple to the second terminals.

* * * * *